United States Patent
Kim et al.

(10) Patent No.: US 7,879,398 B2
(45) Date of Patent: Feb. 1, 2011

(54) CARBON-NANO TUBE STRUCTURE, METHOD OF MANUFACTURING THE SAME, AND FIELD EMITTER AND DISPLAY DEVICE EACH ADOPTING THE SAME

(75) Inventors: Ha-Jin Kim, Suwon-si (KR); In-Taek Han, Seoul (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1011 days.

(21) Appl. No.: 10/929,381

(22) Filed: Aug. 31, 2004

(65) Prior Publication Data

US 2005/0046322 A1      Mar. 3, 2005

(30) Foreign Application Priority Data

Sep. 1, 2003      (KR) ............ 10-2003-0060753

(51) Int. Cl.
*C23C 16/00* (2006.01)
(52) U.S. Cl. ............... 427/249.1; 427/249.4; 427/248.1
(58) Field of Classification Search ............ 427/249.1, 427/248.1, 249.4
See application file for complete search history.

(56) References Cited

U.S. PATENT DOCUMENTS

| | | | |
|---|---|---|---|
| 5,187,021 | A | 2/1993 | Vydra et al. |
| 6,325,909 | B1 | 12/2001 | Li et al. |
| 7,084,507 | B2 | 8/2006 | Awano |
| 2002/0163079 | A1* | 11/2002 | Awano ............ 257/750 |
| 2003/0151344 | A1 | 8/2003 | Cheng et al. |
| 2003/0161782 | A1* | 8/2003 | Kim ............ 423/447.3 |
| 2004/0009308 | A1 | 1/2004 | Schlaf et al. |

FOREIGN PATENT DOCUMENTS

JP      10149760      6/1998

(Continued)

OTHER PUBLICATIONS

*Korean Office Action* issued by the Korean Intellectual Property Office in applicant's corresponding Korean Patent Application No. 10-2003-0060753 on Apr. 28, 2005.

(Continued)

*Primary Examiner*—Timothy H Meeks
*Assistant Examiner*—Kelly M Gambetta
(74) *Attorney, Agent, or Firm*—Robert E. Bushnell, Esq.

(57) ABSTRACT

A carbon-nano tube (CNT) structure comprises a substrate and a plurality of CNTs, each CNT comprising a plurality of first CNTs grown perpendicular to the substrate and a plurality of second CNTs grown on sidewalls of the first CNTs. A method of manufacturing CNTs includes growing first CNTs on a substrate on which a catalyst material layer is formed, and growing second CNTs on surfaces of the first CNTs from a catalyst material on surfaces of the first CNTs. The second CNTs grown on the sidewalls of the first CNTs emit electrons at a low voltage. In addition, the CNT structure exhibits high electron emission current due to the second CNTs being used as electron emission sources, and exhibits uniform field emission due to the uniform diameter of the first CNTs. A display device incorporates the above-described structure.

18 Claims, 9 Drawing Sheets

FOREIGN PATENT DOCUMENTS

| | | |
|---|---|---|
| JP | 2002-293521 | 10/2002 |
| JP | 2002-329723 | 11/2002 |

OTHER PUBLICATIONS

European Office action for European Patent Application No. 03257600.1, issued on Oct. 6, 2005.

An article "3D Shape-based retrieval within the MPEG-7 framework" written by Zaharia, et al. published in the International Society for Optical Engineering Spie, vol. 4304 pp. 133-145 in 2001 (with English abstract).

An article "Streaming 3D geometry data over lossly communication channels" written by Bischoff, et al. published in 2002 Ieee International Conference on Lausanne, Swetzerland, pp. 361-364 on Aug. 26, 2002 (with English abstract).

An article "Content-based retrieval of medical images" written by Petrakis, published in International Journal of Computer Research, vol. 11 pp. 171-182 on Jun. 30, 2002 (with English abstract).

European Search Report for European Patent Application No. 04 255 048.3, issued on Jul. 11, 2006.

An article "Tubes on tube—a novel form of aligned carbon nanotubes" written by Tsai, et al. published in Carbon 40 on Apr. 8, 2002.

An article "Carbon nanotube dendrites: Availability and their growth model" written by Cao, et al. published in Material Research Bulletin, on Jul. 13, 2001 (with English abstract).

Chinese Office action corresponding to Chinese Patent Application No. 2004100749350, issued on Nov. 24, 2006.

Y.C. Sui et al. J. Phys.Chem. B, "Structure, Thermal Stability, and Deformation of Multibranched Carbon Nanotubes Synthesized by CVD in the AAO Template", vol. 105, pp. 1523-1527.

Japanese Office Action issued by Japanese Patent Office on Nov. 16, 2010 corresponding to Korean Patent Application No. 2003-60753 and Request for Entry of the Accompanying Office Action attached herewith.

\* cited by examiner

CARBON-NANO TUBE STRUCTURE, METHOD OF MANUFACTURING THE SAME, AND FIELD EMITTER AND DISPLAY DEVICE EACH ADOPTING THE SAME

CLAIM OF PRIORITY

This application makes reference to, incorporates the same herein, and claims all benefits accruing under 35 U.S.C. §119 from an application for CARBON-NANO TUBE STRUCTURE, METHOD OF MANUFACTURING THE SAME, AND FIELD EMITTER AND DISPLAY DEVICE EACH ADOPTING THE SAME earlier filed in the Korean Intellectual Property Office on Sep. 1, 2003 and there duly assigned Serial No. 2003-60753.

BACKGROUND OF THE INVENTION

1. Technical Field

The present invention relates to a carbon-nano tube (CNT) structure, a method of manufacturing the same, and a field emitter and a display device, each adopting the same.

2. Related Art

With the disclosure of the structural and electric characteristics of CNT, studies of CNT have been performed to apply the CNT to various devices, such as field emitters, transistor and secondary batteries. More specifically, CNT used as an emitter of a field emission display (FED) has various merits, such as low operation voltage, high luminance and low price, and the application of CNT to an emitter will be commercially used within a short time. Examples of methods of manufacturing CNT include a screen printing method using CNT powder, and a method using chemical vapor deposition (CVD). The method using CVD has been actively studied because such a method can be used to manufacture a display device with high resolution, and requires a simple process of growing CNT on a substrate. Examples of CVD include plasma enhanced chemical vapor deposition (PECVD) and thermal chemical vapor deposition (thermal CVD).

In order to manufacture a high-quality FED, CNT used as an emitter should have a low operation voltage, a high electron emission current, and uniform characteristics over a large area. CNT can have a low operation voltage and a high electron emission current when the CNT has a small diameter and is formed to a proper density. The diameter of CNT depends on the size of a catalyst metal, which exists on the CNT, such that a smaller catalyst particle can produce CNT having a small diameter. In addition, the CNT should be formed in one direction so as to control the density of the CNT, and the temperature of a growth system should be uniform so as to obtain uniform electron emission over a large area.

SUMMARY OF THE INVENTION

The present invention relates to a carbon-nano tube (CNT) structure which has low operating voltage, high electron emission current, and uniform electron emission over a large area, and the invention also relates to a method of manufacturing a CNT structure, and a field emitter and a display device, each adopting the same.

According to an aspect of the present invention, there is provided a CNT structure including a substrate and a large number of CNTs, the CNT structure comprising a large number of first CNTs grown perpendicular to the substrate and a large number of second CNTs grown on sidewalls of the first CNTs.

The first CNTs may be grown by chemical vapor deposition (CVD), and the second CNTs may be grown by CVD. The first CNTs may be grown from a catalyst material disposed on the substrate, and the second CNTs may be grown from a catalyst material existing on the sidewalls of the first CNTs.

The catalyst material may be a transition metal, such as Fe, Ni and Co, or an Fe—Ni—Co alloy.

According to another aspect of the present invention, there is provided a method of manufacturing CNTs comprising the steps of forming a catalyst material layer on a substrate, growing first CNTs from the catalyst material layer, and growing second CNTs on the surfaces of the first CNTs from a catalyst material existing on the surfaces of the first CNTs.

Nano-scale catalyst material particles may exist on the surfaces of the first CNTs, and the second CNTs maybe grown from the catalyst material particles. More specifically, the first CNTs may be formed by PECVD, and the second CNTs may be formed on the surfaces of the first CNTs by thermal CVD from the catalyst material existing on the surfaces of the first CNTs.

According to still another aspect of the present invention, there is provided a method of manufacturing CNTs comprising the steps of forming a catalyst material layer on a substrate, growing first CNTs from the catalyst material layer, forming a second catalyst material layer on the surfaces of the first CNTs, and growing second CNTs on the surfaces of the first CNTs from the catalyst material formed on the surfaces of the first CNTs.

The second catalyst material layer is formed on the surfaces of the first CNTs after the first CNTs are grown. Then, the second CNTs are grown on the first CNTs from the second catalyst material layer. The second catalyst material layer may exist on the surfaces of the first CNTs in a particle state, and such a second catalyst material layer may be formed by using an electron-beam evaporator or a sputter. The second catalyst material layer may also be formed by plasma deposition, electrodeposition, pulse laser deposition, CVD, or a nano-catalyst particle method using a catalyst solution or block copolymer micelles (BCM). The second CNTs may be grown on the surfaces of the first CNTs by thermal CVD after the second catalyst material layer is formed on the surfaces of the first CNTs.

The catalyst material may be a transition metal, such as Fe, Ni and Co, or a Fe—Ni—Co alloy.

In the embodiments of the present invention, a first CNT is formed with a predetermined density on a substrate, and a second CNT is formed from a second catalyst material existing on the surface of the first CNT. Thus, the electron emission characteristic of the CNT is improved, and the CNT is uniformly grown.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

The present invention will now be described more fully with reference to the accompanying drawings, in which exemplary embodiments of the invention are shown. First, methods of growing carbon-nano tubes by plasma enhanced chemical vapor deposition (PECVD) and CVD will be described.

Figure 1A:
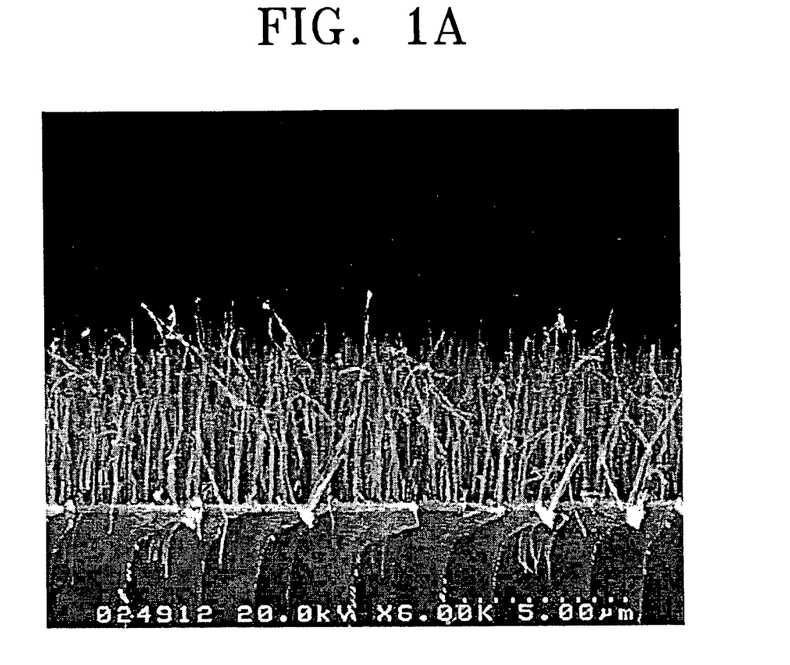
FIGS. 1A and 1B are SEM photographs of carbon-nano tube (CNT) grown by plasma enhanced chemical vapor deposition (PECVD)
Figure 1B:
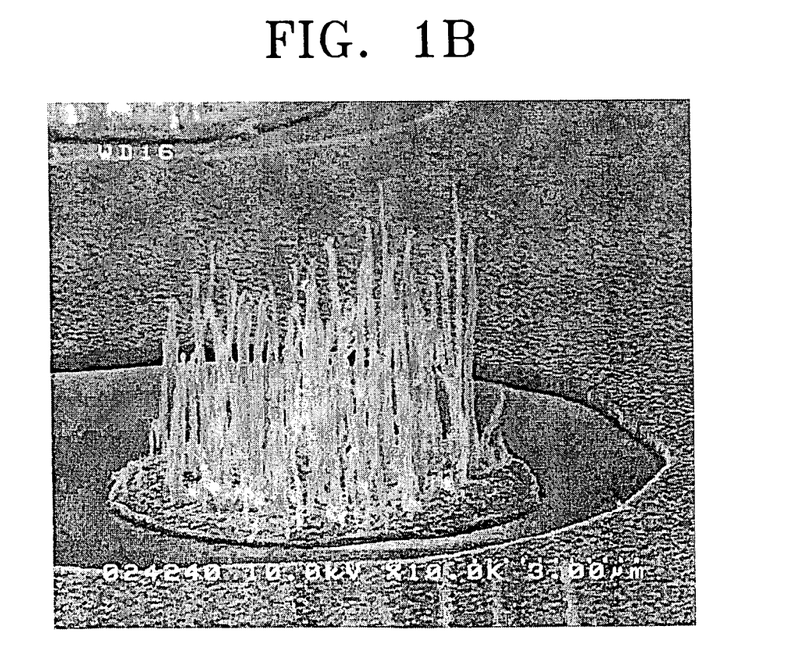

FIGS. 1A and 1B are SEM photographs of carbon-nano tube (CNT) grown by PECVD.

The SEM photograph of FIG. 1A illustrates CNT grown on a Cr and Fe—Ni—Co alloy based metal catalyst, which is not patterned, on a glass substrate for 30 minutes. The CNT of FIG. 1A is grown perpendicular to the substrate to a length of about 5 µm, and has a diameter of about 50 to 80 nm.

FIG. 1B illustrates a CNT formed by patterning a Cr and Fe—Ni—Co alloy based metal catalyst in a disk shape having a diameter of 10 µm by using photolithography, and growing for 20 minutes using PECVD. Since the metal catalyst is patterned in a disk shape, the CNT is selectively grown in the disk shaped pattern. The length of the CNT is about 3 µm, and the CNT is distributed in an area having a diameter of 50 to 80 nm. In the method of growing CNT by PECVD, CNT is grown perpendicular to a substrate and synthesized at a relatively low temperature. The growing direction of CNT depends on the direction of an electric field applied between an anode and a cathode in a PECVD system. In addition, the growing direction of the CNT is uniform, thus making it easy to control the density of the CNT and to emit electrons by using an electric field. However, the method of growing CNT by PECVD uses a direct current power source, and therefore it is impossible to stir plasma on a glass substrate and to grow uniform CNT. In addition, the diameter of CNT grown at a low temperature is relatively large so that the field emission characteristics of the CNT are bad.

Figure 2A:
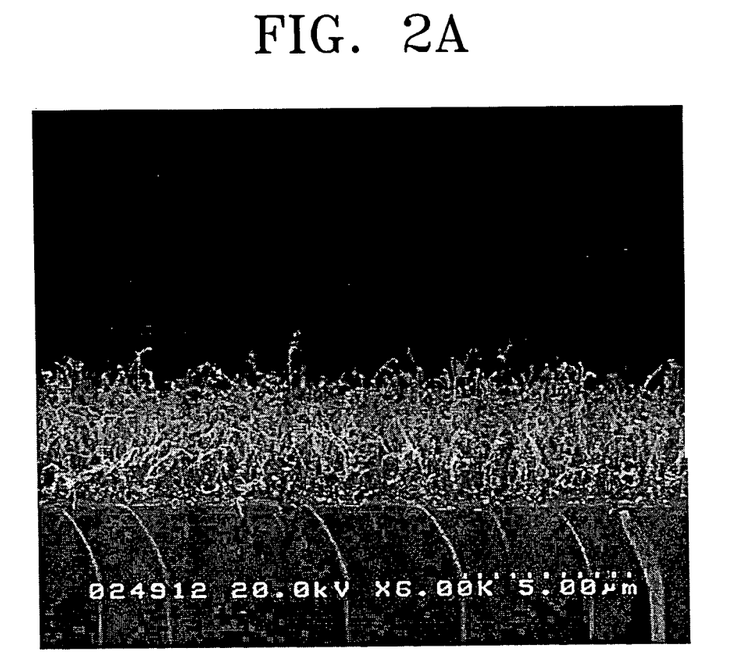
FIGS. 2A and 2B are SEM photographs of CNT grown by thermal CVD.
Figure 2B:
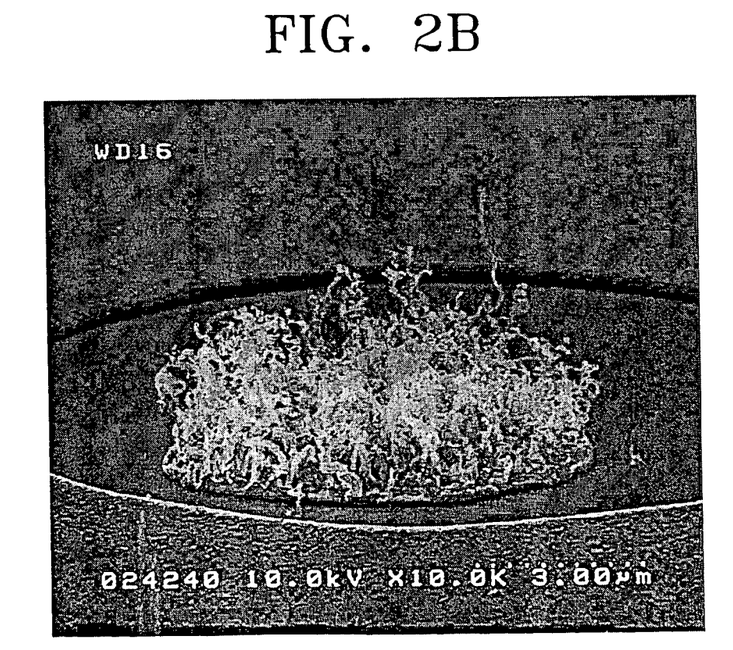

FIGS. 2A and 2B are SEM photographs of CNT grown by thermal CVD.

CNT grown on a flat substrate as shown in FIG. 2A, and CNT grown on a patterned substrate as shown in FIG. 2B, are grown in random directions and tangled. The diameter of the CNT is about 40 to 50 nm, which is smaller than CNT grown by PECVD, and the length of the CNT is about 4 µm. The method of forming CNT by thermal CVD can be used to form uniform CNT because the temperature of a specimen is uniform, and the method can be used to form CNT having a low electron emission turn on voltage because the CNT has a small diameter.

However, there is no electric field when thermal CVD is used to grow CNT, and thus the growing direction of the CNT is random. In addition, thermal CVD causes gas analysis due to thermal energy, and thus the growing temperature is relatively high.

CNT used as a field emitter should have a high electron emission current at a low operation voltage and uniform electron emission over a large area.

Embodiments of the present invention will now be described. In the embodiments of the present invention, the substrate is a material composed of glass, a wafer, or a catalyst of a fuel battery.

In a first embodiment of the present invention, a first catalyst material layer is formed on a substrate, and first CNT is grown in a vertical direction using PECVD, by means of which the density of the CNT may easily be controlled. Thereafter, second CNT is grown on the surface of the first CNT by thermal CVD.

In a second embodiment of the present invention, first CNT is grown, and a catalyst material layer is formed on the surface of the first CNT. Thereafter, second CNT is grown on the surface of the first CNT.

The catalyst material layer is in a particle state when formed on the surface of the first CNT. The catalyst material layer in the particle state exists at the tip of the first CNT after the first CNT is formed by PECVD, and the second CNT is formed from the catalyst material layer. However, when the catalyst material layer is not formed on the surface of the first CNT or the amount of catalyst material is not sufficient, a separate second catalyst material layer may be formed on the surface of the first CNT.

Figure 3:
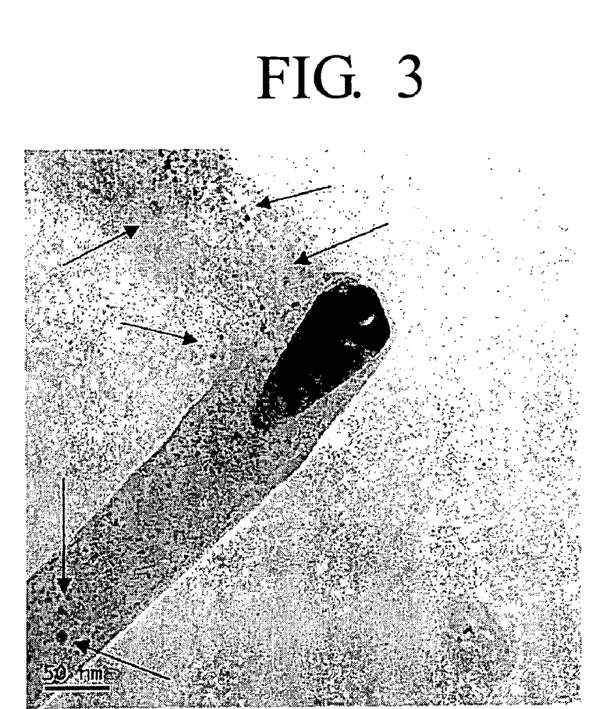
FIG. 3 is a TEM photograph illustrating nano-catalyst particles formed on the surface of a first CNT.

The catalyst material used when growing the first CNT is broken into small pieces by strain between a carbon layer of the first CNT and the catalyst material, and the broken pieces of the catalyst material remain on the surface of the first CNT in a particle state. A large number of catalyst particles having nanometer diameters exist on the surface of the first CNT, which is grown by PECVD. The catalyst particles are formed to a uniform size of 5 to 7 nm and on the entire surface of the first CNT. FIG. 3 is a TEM photograph illustrating nano-catalyst particles formed on the surface of the first CNT, as denoted by arrows in the TEM photograph of FIG. 3.

Figure 4:
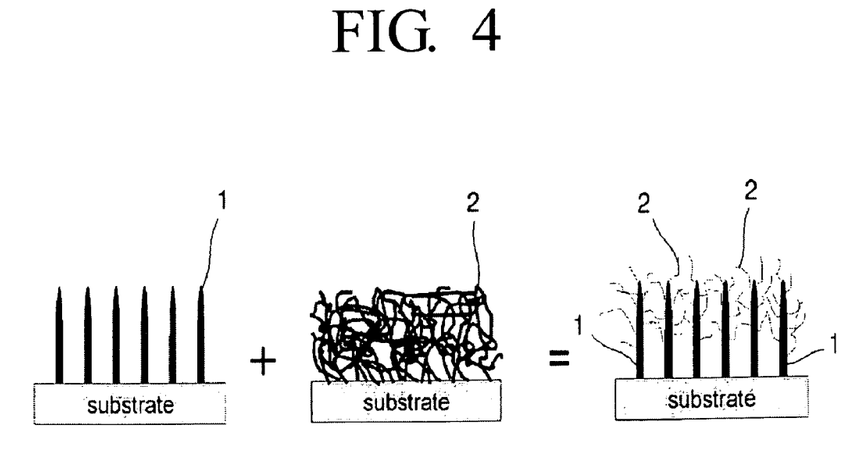
FIG. 4 is a sectional view illustrating a manufacturing method of a CNT according to the present invention.

FIG. 4 is a sectional view illustrating a method of manufacturing CNT according to an embodiment of the present invention. Referring to FIG. 4, the directional growth of first CNT 1 and the random growth of second CNT 2 are combined to grow the second CNT 2 on the surface of the first CNT 1 in a branched shape.

To this end, the first CNT 1, the density of which can be controlled, is grown in a vertical direction using PECVD, and the second CNT 2 is grown from the nano-catalyst particles existing on the surface of the first CNT 1 using thermal CVD. The second CNT 2 improves a field enhancement factor and increases an electron emission area, resulting in a low operation voltage and a high electron emission current.

The first embodiment of the present invention will now be described. In the first embodiment of the present invention, DC-plasma is used to grow CNT by PECVD, an acetylene gas ($C_2H_2$) of 98% is used as a carbon source for CNT, and an ammonia gas ($NH_3$) of 99.999% is used to analyze gases and etch a metal catalyst. Before growing the CNT, a Cr layer is deposited on a glass substrate to a thickness of about 150 nm by using an electron beam evaporator in order to improve adherence between the CNT and the substrate. Thereafter, a catalyst material, for example, an Fe—Ni—Co alloy based material, is deposited on the Cr layer to a thickness of 10 nm. The catalyst material is composed of 52% Fe, 42% Ni, and 6% Co. In order to grow the first CNT, a specimen formed by depositing the catalyst material on the substrate is placed in a PECVD chamber, and the pressure of the PECVD chamber is set to 10 to 20 Torr by using a rotary pump. Thereafter, ammonia gas is injected into the PECVD chamber at a rate of 300 sccm while maintaining the pressure of the PECVD chamber at 4 Torr, and the specimen is heated to 430° C. by using a graphite heater. When the temperature of the specimen reaches 430° C., a plasma generator is used to etch ammonia plasma, thereby shaping an Invar catalyst material layer in small island shapes. In the latter regard, plasma power is 500 W, and the distance and the voltage between a shower head as an anode and a susceptor as a cathode are set to 4 cm and 550V, respectively. The ammonia plasma is used to etch for 3 minutes while increasing the temperature of the substrate to 500° C. After etching with the ammonia plasma, acetylene is injected into the PECVD chamber along with ammonia at a rate of 70 sccm. In this case, changes in the plasma power and the voltage are small enough to be neglected. The first CNT is grown under the stable plasma for 30 minutes.

On the other hand, thermal CVD analyzes and synthesizes a gas, including carbon, on the surface of a catalyst metal by using thermal energy. In the present embodiment, thermal CVD is performed by directly heating the surface of a substrate by using an infrared ray heater. Carbon monoxide (CO) is used as a carbon source, and hydrogen gas ($H_2$) is used to analyze gases and prevent oxidation of the substrate. Here, the CNT is grown at a pressure of one atmosphere and at a temperature of 600° C. The substrate on which the first CNT is grown by PECVD is inserted into a loadlock chamber, the pressure of the chamber is set to $5\times10^{-2}$ Torr by using a rotary pump, and then the substrate is transferred to a growth chamber. A growth gas is injected into the growth chamber, and the pressure of the growth chamber is maintained at one atmosphere. The growth gas includes carbon monoxide at a rate of 350 sccm and hydrogen gas at a rate of 1,000 sccm. When the pressure of the growth chamber reaches one atmosphere, the growth chamber is heated by an infrared ray heater for 20 minutes to reach 600° C., and the temperature is maintained for 10 minutes. Thereafter, the growth gas is exhausted from the growth chamber, the growth chamber is cooled, and the substrate is inserted.

The first embodiment of the present invention can be applied to a case where a catalyst material used when growing the first CNT, exists on the surface of the first CNT. However, when the catalyst material for growing the second CNT on the surface of the first CNT by thermal CVD does not exist on the surface of the first CNT, or when the amount of the catalyst material existing on the first CNT is insufficient, a second catalyst material layer is formed on the surface of the first CNT in a particle state, as in the second embodiment of the present invention.

Such a second catalyst material layer can be formed by using an electron-beam evaporator or a sputter. The second catalyst material layer can also be formed by plasma deposition, electrodeposition, pulse laser deposition, CVD, or a nano-catalyst particle method using a catalyst solution or block copolymer micelles (BCM). In the second embodiment of the present invention, the second CNT is grown on the surface of the first CNT by thermal CVD after the second catalyst material layer is formed on the surface of the first CNT.

Figure 5A:
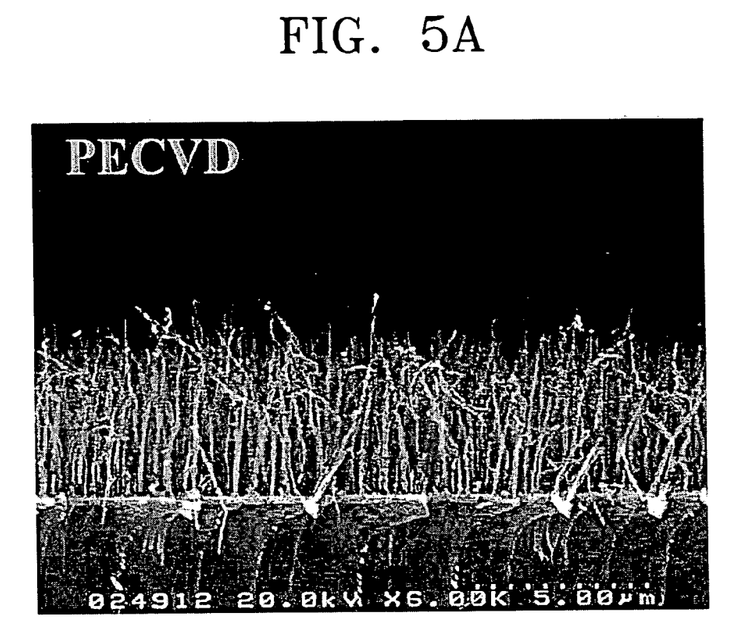
FIG. 5A is an SEM photograph of a first CNT according to the present invention.
Figure 5B:
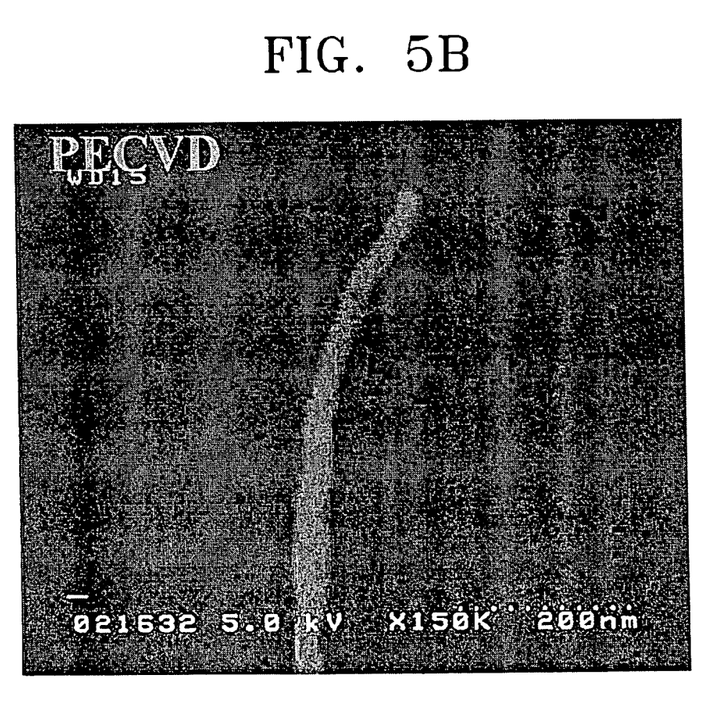
FIG. 5B is an SEM photograph of a first CNT with a second CNT grown thereon by thermal CVD according to an embodiment of the present invention.

FIG. 5A is an SEM photograph of the first CNT. Referring to FIG. 5A, the first CNT is grown to a length of about 5 μm and perpendicular to the substrate. FIG. 5B is an SEM photograph illustrating the first CNT with the second CNT grown thereon. When the second CNT is grown by thermal CVD for about 20 minutes, the length of the first CNT is increased to about 6 μm, and the second CNT is formed on the lower part and the upper surface of the first CNT.

Figure 5C:
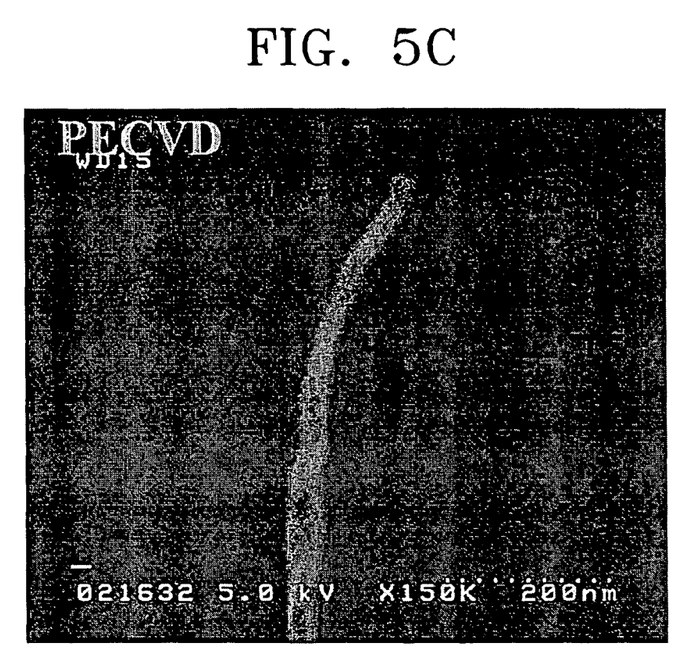
FIG. 5C is an SEM photograph of an enlarged view of the CNT of FIG. 5A.
Figure 5D:
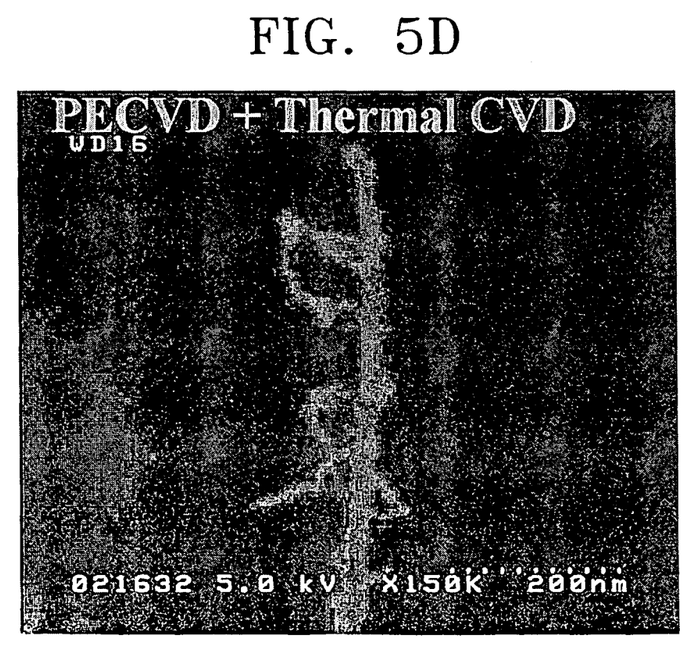
FIG. 5D is an SEM photograph of an enlarged view of the CNT of FIG. 5B.

FIGS. 5C and 5D are SEM photographs illustrating enlarged views of the CNT of FIGS. 5A and 5B, respectively. The first CNT of FIG. 5C is grown by PECVD and has a diameter of about 40 nm. The first CNT of FIG. 5D, on which the second CNT is grown by thermal CVD, has a diameter equal to that of the first CNT shown in FIG. 5C. In addition, the diameter of the second CNT grown on the surface of the first CNT is about 7 nm, which is the same as the size of a nano-catalyst particle. Furthermore, the second CNT grown by thermal CVD is arranged in random directions.

FIGS. 6A through 6D are TEM photographs of the second CNT. The diameter of the second CNT is 7 nm, which is the same as the size of the nano-catalyst particles existing on the surface of the first CNT. In addition, the second CNT is formed in random directions. It was found that the second CNT is grown from the nano-catalyst particles existing on the surface of the first CNT having a diameter of about 70 nm, which is grown by PECVD, and the catalyst particles are absent from the tips of the second CNT. The first CNT is formed in the same direction as an electric field. Accordingly, in order to form the second CNT from the nano-catalyst particles existing on the surface of the first CNT, the direction of the electric field should be perpendicular to the growing direction of the CNT. In other words, the second CNT cannot be grown by PECVD. When the second CNT is grown by PECVD, the nano-catalyst particles existing on the surface of the first CNT receive power in a direction perpendicular to the first CNT, and are placed in the direction perpendicular to the flow direction of carbon, so that the nano-catalyst particles cannot be activated. Accordingly, the second CNT can be grown on the surface of the first CNT by thermal CVD. In thermal CVD following a base-growth model, movement of the nano-catalyst particles is not required, and the growing direction of the CNT is random, thus growing the second CNT by thermal CVD.

Figure 6A:
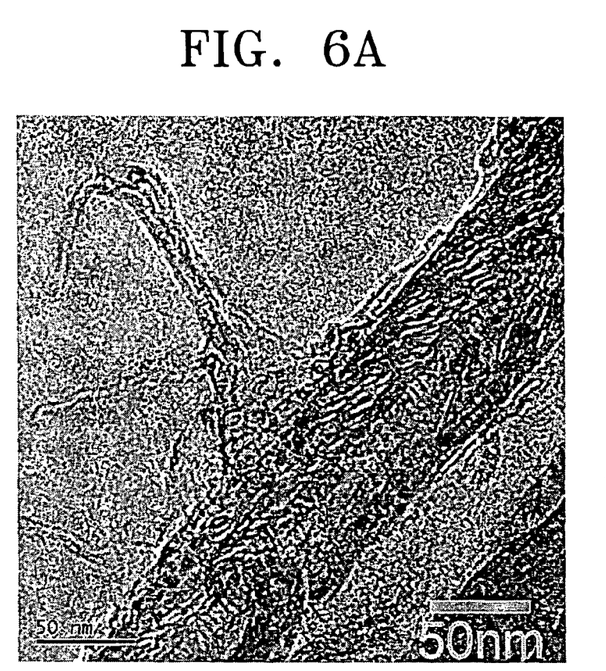
FIGS. 6A through 6D are TEM photographs of a second CNT according to an embodiment of the present invention.
Figure 6B:
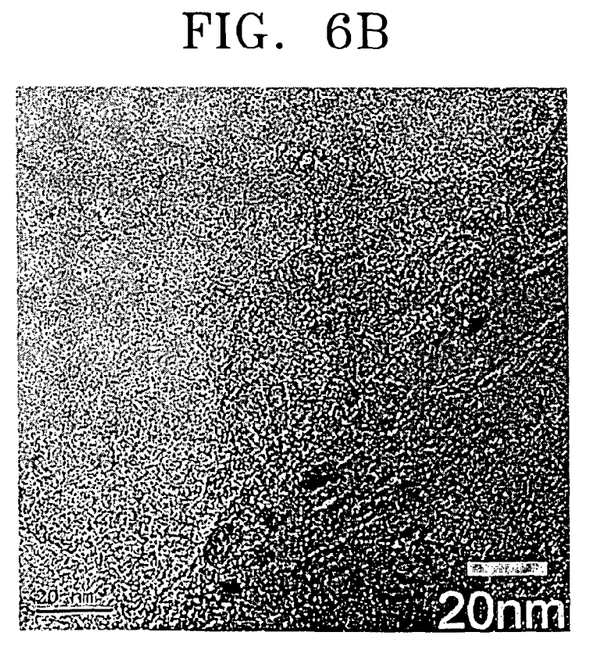
Figure 6C:
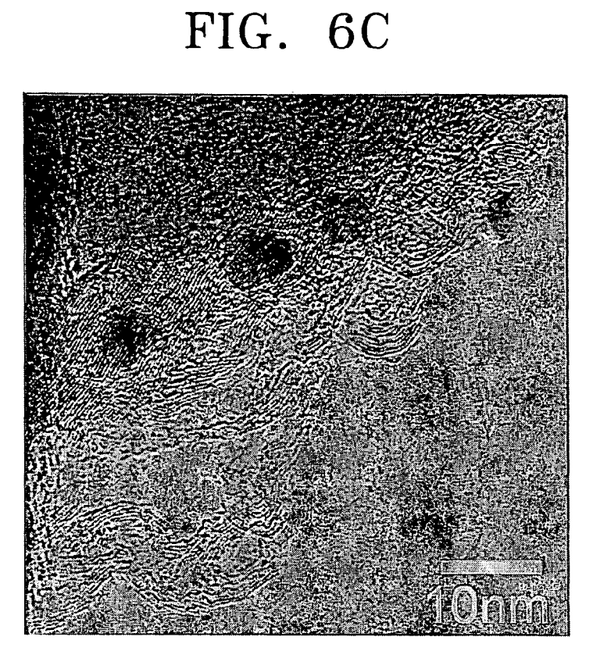
Figure 6D:
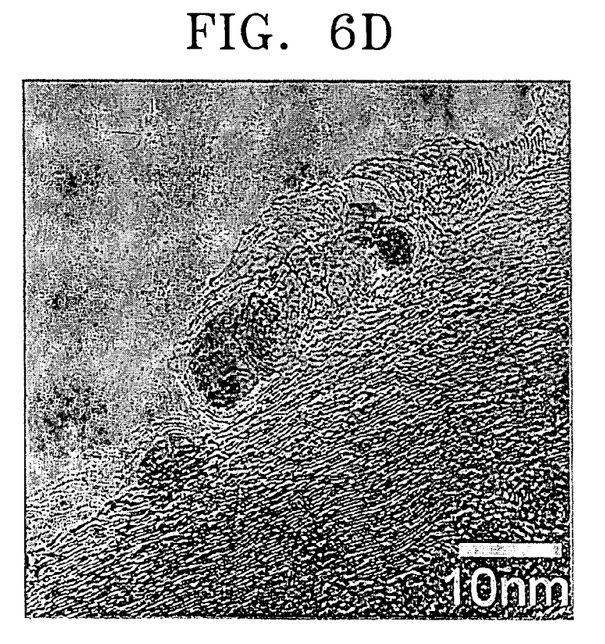

The TEM photographs of FIGS. 6B through 6D illustrate that, when the diameter of the second CNT is determined by the size of the nano-catalyst particles on the sidewall of the first CNT, the second CNT is grown by thermal CVD following a base-growth model.

Figure 7A:
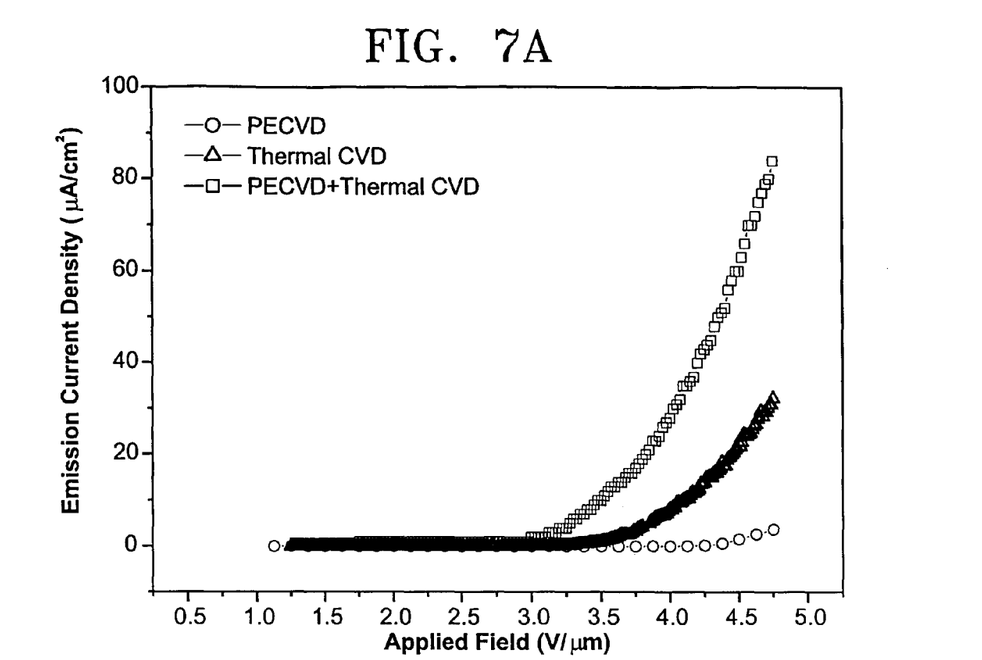
FIG. 7A is a graph illustrating electron emission characteristics of carbon-nano tubes formed by PECVD, CVD, and PECVD and CVD.

FIG. 7A is a graph illustrating electron emission characteristics of CNT formed by PECVD, CVD, and PECVD combined with CVD, according to the embodiment of the present invention. The electron emission turn-on voltage of the CNT grown by PECVD is about 4.5V/μm, which is the highest of the measured values, because the CNT has the largest diameter due to its being grown at a relatively low temperature. The electron emission turn-on voltage of the CNT grown by thermal CVD, which has a relatively smaller diameter, is about 3.5V/μm. The electron emission turn-on voltage of the CNT grown by PECVD and thermal CVD is about 3V/μm, which is the lowest of the measured values. In addition, the electron emission currents of the CNT grown by PECVD and by thermal CVD are 1.6 μm/cm$^2$ and 22.7 μm/cm$^2$, respectively, under an electric field of 4.5V/μm. The electron emission current of the CNT grown by PECVD combined with thermal CVD is 60 μm/cm² under the electric field of 4.5V/μm, which is 30 to 40 times larger than the electric emission currents of the conventional CNT. The field emission turn-on voltage is lowered and the electron emission current is increased due to increase in a field enhancement factor due to the second CNT. The field enhancement factor denotes the degree of enhancement of a partial field of an electric field due to geometric factors of an emitter. As the field enhancement factor increases, the electron emission current increases without a change in the electric field.

Figure 7B:
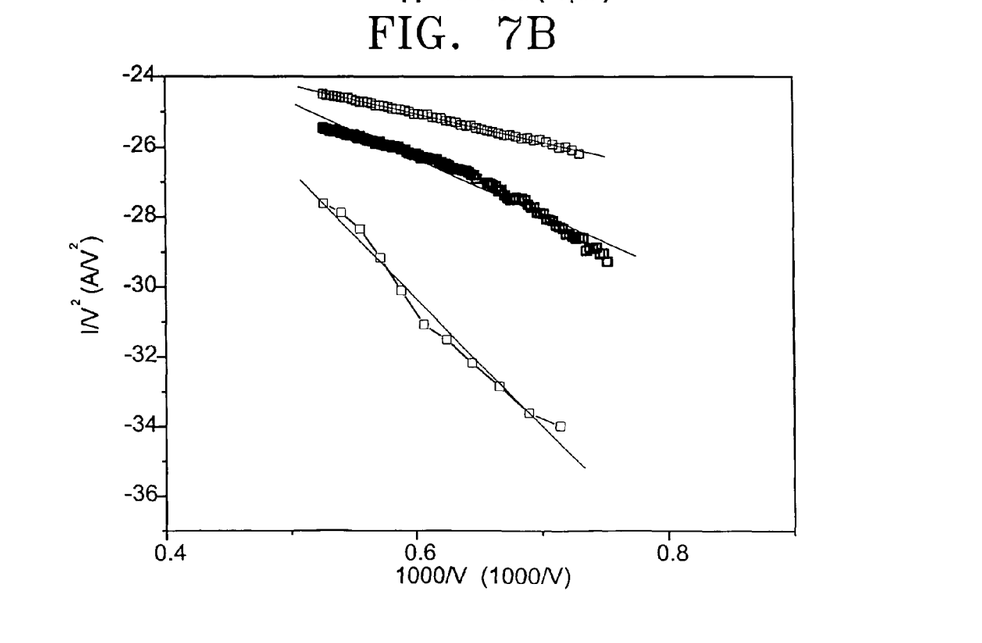
FIG. 7B is a Fowler-Nordheim (F-N) plot derived from the graph of FIG. 7A.

FIG. 7B is a Fowler-Nordheim (F-N) plot derived from the electron emission currents of FIG. 7A. The field enhancement factor can be obtained based on the gradient of the F-N plot. The gradients of the F-N plots for the CNT grown by PECVD and by thermal CVD are 798 (cm$^{-1}$) and 1,383 (cm$^{-1}$), respectively, and the gradient of the F-N plot for the CNT grown by PECVD combined with thermal CVD is 3,632 (cm$^{-1}$). Accordingly, the second CNT not only increases the number of electron emission sources, but also improves the electron emission characteristic due to the change in the geometrical structure of the CNT. As described above, the first CNT grown by PECVD is formed in a direction perpendicular to the substrate while controlling the density of the first CNT. The second CNT grown by thermal CVD is formed from the nano-catalyst metal particles. Thus, the CNT according to the embodiment of the present invention is uniformly grown, and has an improved electron emission characteristic.

Such a CNT structure may be applied to various devices, such as a field emitter and a display device.

Figure 8:
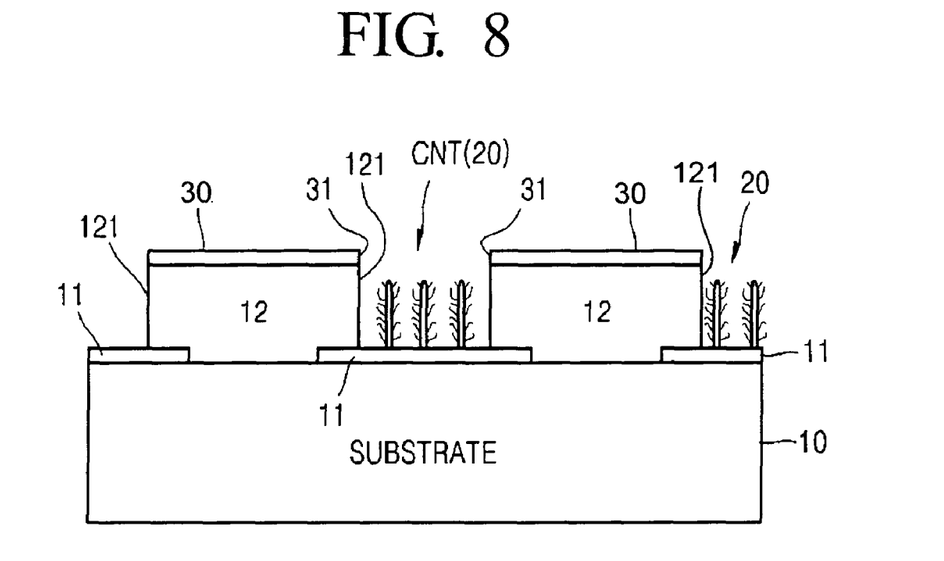
FIG. 8 is a sectional view of a field emitter to which CNT according to an embodiment of the present invention is applied.

FIG. 8 is a sectional view of a field emitter to which CNT according to the embodiment of the present invention is applied as a field emission source.

Referring to FIG. 8, cathode electrodes 11 are formed on a substrate 10, and gate insulating layers 12 are formed thereon. Wells 121 corresponding to the cathodes 11 are formed in the gate insulating layers 12. Accordingly, the cathodes 11 are exposed by the wells 121. CNT 20 is formed on the surfaces of the cathodes 11 exposed by the wells 121. The CNT 20 includes first CNTs, which are perpendicular to the substrate 10, and second CNTs, which are formed on the surfaces of the first CNTs. Gate electrodes 30 having gates 31, which correspond to the wells 121, are formed on the gate insulating layers 12.

Figure 9:
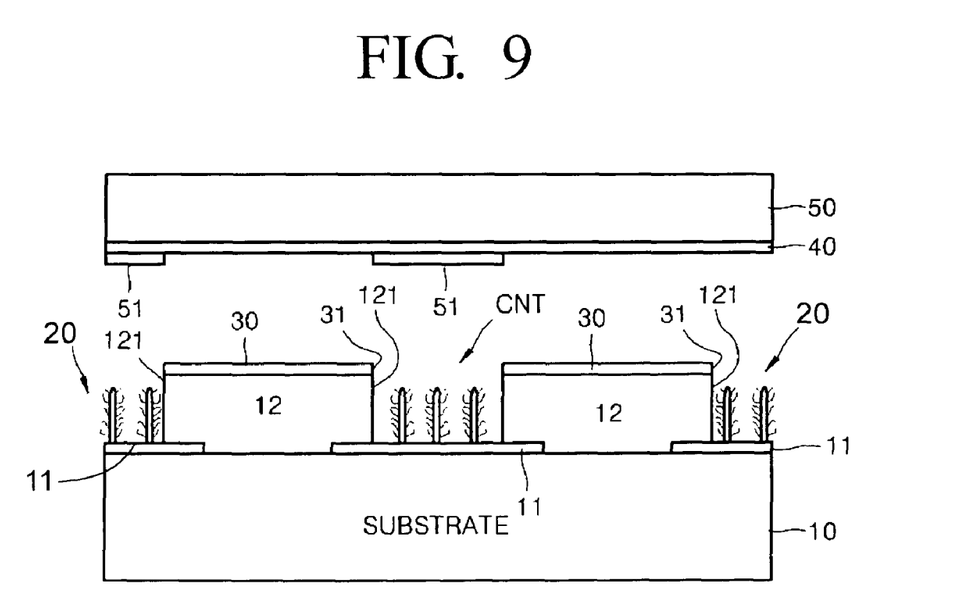
FIG. 9 is a sectional view of a display device to which CNT according to an embodiment of the present invention is applied.

FIG. 9 is a sectional view of a display device including the field emitter of FIG. 8.

Referring to FIG. 9, cathode electrodes 11 are formed on a substrate 10, and gate insulating layers 12 are formed thereon. Wells 121 corresponding to the cathodes 11 are formed in the gate insulating layers 12. Accordingly, the cathodes 11 are exposed by the wells 121. CNTs 20 are formed on the surfaces of the cathodes 11 exposed by the wells 121. The CNTs 20 include first CNTs, which are perpendicular to the substrate 10, and second CNTs, which are formed on the surfaces of the first CNTs. Gate electrodes 30 having gates 31, which correspond to the wells 121, are formed on the gate insulating layers 12.

A front plate 50 is disposed a predetermined distance above the gate electrodes 30. An anode 40 corresponding to the cathodes 11 is formed on the lower surface of the front plate 50, and fluorescent layers 51 are formed on a lower surface of the anode 40.

The effects of the CNT according to the embodiment of the present invention will now be described.

First, electron emission voltage is lowered due to the second CNT being formed on the sidewalls of the first CNT. Second, electron emission current is increased due to the increase in the number of electron emission sources, that is, an increase in the number of the second CNTs. Third, uniform field emission is obtained due to the uniform diameter of the first CNT. Fourth, it is possible to improve field emission characteristics by controlling the density of the first CNT, which is grown by PECVD and which is perpendicular to the substrate. Fifth, the efficiencies of the chemical and physical reactions of the CNT and a device using the CNT are improved due to the increase in the surface area of the CNT.

Such a CNT not only improves the characteristics of a field emitter, but also improves the characteristics of devices using the CNT, such as the catalyst of a fuel battery and the cathode of a secondary battery. In addition, the CNT may improve the secondary electron emission by coating an MgO layer.

The CNT structure according to the present invention provides a large specific surface area, and can be used in an apparatus that requires high chemical, and physical efficiency, for example, a hydrogen storage cell or an electrode of a super capacitor.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A method of manufacturing CNTs, comprising the steps of:
   forming a catalyst material layer on a substrate;
   growing first CNTs in a vertical direction and separately from the catalyst material layer; and
   growing second CNTs on surfaces of each of the first CNTs in a random direction, thereby forming a branched shape from catalyst material existing on the surfaces of said each of the first CNTs;
   wherein the second CNT grown on each first CNT is separate and disconnected from the second CNT grown on any other first CNT; and
   wherein a second catalyst material layer is formed on a surface of the first CNT, and the second CNT is grown on the surface of the first CNT after the second catalyst material layer is formed on the surface of the first CNT.

2. The method of claim 1, wherein the first CNTs are formed by chemical vapor deposition (CVD).

3. The method of claim 2, wherein the second CNTs are formed by chemical vapor deposition (CVD).

4. The method of claim 1, wherein the second CNTs are formed by chemical vapor deposition (CVD).

5. The method of claim 4, wherein the catalyst material is a transition metal selected from the group consisting of Fe, Ni, Co, and an Fe—Ni—Co alloy.

6. The method of claim 3, wherein the catalyst material is a transition metal selected from the group consisting of Fe, Ni, Co, and an Fe—Ni—Co alloy.

7. The method of claim 2, wherein the catalyst material is a transition metal selected from the group consisting of Fe, Ni, Co, and an Fe—Ni—Co alloy.

8. The method of claim 1, wherein the catalyst material is a transition metal selected from the group consisting of Fe, Ni, Co, and an Fe—Ni—Co alloy.

9. The method of claim 1, wherein the second catalyst material layer is formed on the surface of the first CNT by a non-catalyst particle method using one of a catalyst solution and a block copolymer micelles (BCM).

10. The method of claim 1, wherein the second CNT is grown on the surface of the first CNT by thermal CVD after the second catalyst material layer is formed on the surface of the first CNT.

11. A method of manufacturing CNTs, comprising the steps of:
   forming a catalyst material layer on a substrate;
   growing first CNTs in a vertical direction and separately from the catalyst material layer;
   forming a second catalyst material layer on surfaces of each of the first CNTs; and
   growing second CNTs on the surfaces of each of the first CNTs in a random direction after the second catalyst material layer is formed on the surfaces of said each of the first CNTs, thereby forming a branched shape from the catalyst material layer formed on the surfaces of said each of the first CNTs;
   wherein the second CNT grown on each first CNT is separate and disconnected from the second CNT grown on any other first CNT.

12. The method of claim 11, wherein the second catalyst material layer is formed using a catalyst-containing solution by one of electron beam evaporation, sputtering, plasma deposition, electrodeposition, pulse laser deposition, and chemical vapor deposition (CVD).

13. The method of claim 11, wherein the first CNTs are formed by chemical vapor deposition (CVD).

14. The method of claim 13, wherein the second CNTs are formed by chemical vapor deposition (CVD).

15. The method of claim 11, wherein the second CNTs are formed by chemical vapor deposition (CVD).

16. The method of claim 11, wherein the catalyst material layer is formed from a catalyst material comprising a transition metal selected from the group consisting of Fe, Ni, Co, and an Fe—Ni—Co alloy.

17. The method of claim 11, wherein the second catalyst material layer is formed on the surfaces of said each of the first CNTs by a non-catalyst particle method using one of a catalyst solution and a block copolymer micelles (BCM).

18. The method of claim 11, wherein the second CNTs are grown on the surfaces of said each of the first CNTs by thermal CVD after the second catalyst material layer is grown on the surfaces of said each of the first CNTs.

* * * * *